United States Patent
Gill

(12) 
(10) Patent No.: US 6,522,508 B1
(45) Date of Patent: Feb. 18, 2003

(54) MAGNETIC HEAD HAVING CURRENT RESETTABLE INSULATED KEEPER DESIGN

(75) Inventor: Hardayal Singh Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 09/715,234

(22) Filed: Nov. 17, 2000

(51) Int. Cl.[7] .................................................. G11B 5/39
(52) U.S. Cl. .................................................. 360/324.12
(58) Field of Search .................................. 360/324.12

(56) References Cited

U.S. PATENT DOCUMENTS

| | | | |
|---|---|---|---|
| 5,508,867 A | 4/1996 | Cain et al. | 360/113 |
| 6,178,072 B1 * | 1/2001 | Gill | 360/324.11 |

* cited by examiner

*Primary Examiner*—A. J. Heinz
(74) *Attorney, Agent, or Firm*—Robert O. Guillot; Intellectual Property Law Offices

(57) ABSTRACT

The magnetic head of the present invention includes a GMR layer structure that includes a magnetic keeper layer. An electrical insulation layer is fabricated between the keeper layer and the remaining layers of the GMR head, such that electrical current which passes through the read head layers does not pass through the keeper layer. In the preferred embodiment, the keeper layer is composed of a ferromagnetic material, such as NiFe, and the insulation layer is composed of an antiferromagnetic material such as NiO. Once the magnetization of the keeper layer is set, it becomes exchange coupled with the antiferromagnetic layer to pin the keeper layer magnetization. Because the keeper layer is electrically insulated it does not shunt electrical current of the read head, thus the thickness of the keeper layer is unconstrained by the electrical shunting problems of the prior art. Additionally, because the keeper layer is electrically insulated from the read head components, its magnetization can be separately set, or reset utilizing current pulses that pass only through it. In a first preferred embodiment, the keeper layer is fabricated prior to the fabrication of the remaining GMR read head layers, and in a second preferred embodiment, the keeper layer is fabricated following the fabrication of the GMR read head layers.

20 Claims, 2 Drawing Sheets

MAGNETIC HEAD HAVING CURRENT RESETTABLE INSULATED KEEPER DESIGN

BACKGROUND OF THE INVENTION

1. Field of the Invention

The present invention relates generally to read head portions of magnetic heads for disk drives, and more particularly to magnetic keeper elements for such read heads to balance magnetic fields at the free magnetic layer within such heads.

2. Description of the Prior Art

The typical prior art read head elements of a magnetic head include a plurality of thin film layers that are deposited and fabricated to produce a GMR read head, as is known to those skilled in the art. A significant functional aspect of such heads is the orientation of the magnetic field within the free magnetic layer, and it is important for the proper operation of the read head that there be a minimum (near zero) biasing magnetic field at the free layer. It has been recognized that the various magnetic layers of the prior art read head, as well as the flow of electrical current through the read head layers, create unwanted biasing magnetic fields at the free layer. An effort to cure this problem has been the addition of a magnetic keeper layer, which produces a counterbalancing magnetic field at the free magnetic layer to balance out the overall magnetic fields at the free magnetic layer.

In prior art magnetic keeper layer designs, electrical current that flows through the read head also flows through the keeper layer. This creates an unwanted shunting of electrical current that would otherwise flow through the read head layers, thus degrading the performance of the read head. Additionally, because the keeper layer is not electrically isolated from the other read head layers, the magnetic initialization of the hard bias elements of the read head also results in the magnetic setting of the keeper layer, and it is difficult to separately set or reset the magnetization of the keeper layer. The present invention solves these problems with a read head structure in which the keeper layer is electrically insulated from the remaining read head layers. Thus the magnetization of the keeper layer of the present invention can be separately set or reset as desired.

SUMMARY OF THE INVENTION

The magnetic head of the present invention includes a GMR layer structure that includes a magnetic keeper layer. An electrical insulation layer is fabricated between the keeper layer and the remaining layers of the GMR head, such that electrical current which passes through the read head layers does not pass through the keeper layer. In the preferred embodiment, the keeper layer is composed of a ferromagnetic material, such as NiFe, and the insulation layer is composed of an antiferromagnetic material such as NiO. Once the magnetization of the keeper layer is set, it becomes exchange coupled with the antiferromagnetic layer to pin the keeper layer magnetization. Because the keeper layer is electrically insulated it does not shunt electrical current of the read head, thus the thickness of the keeper layer is unconstrained by the electrical shunting problems of the prior art. Additionally, because the keeper layer is electrically insulated from the read head components, its magnetization can be separately set, or reset utilizing current pulses that pass only through it. In a first preferred embodiment, the keeper layer is fabricated prior to the fabrication of the remaining GMR read head layers, and in a second preferred embodiment, the keeper layer is fabricated following the fabrication of the GMR read head layers.

It is an advantage of the magnetic head of the present invention that an electrically isolated keeper layer is provided.

It is another advantage of the magnetic head of the present invention that an electrically isolated keeper layer is provided, such that the magnetization of the keeper layer can be separately set or reset.

It is a further advantage of the magnetic head of the present invention that an electrically isolated keeper layer is provided, such that the, thickness of the keeper layer is relatively unconstrained.

It is yet another advantage of the magnetic head of the present invention that the external magnetic fields at the free layer of the read head can be more effectively balanced.

It is an advantage of the hard disk drive of the present invention that it includes a magnetic head having an electrically isolated keeper layer.

It is another advantage of the hard disk drive of the present invention that it includes a magnetic head having an electrically isolated keeper layer, such that the magnetization of the keeper layer can be separately set or reset.

It is a further advantage of the hard disk drive of the present invention that it includes a magnetic head having an electrically isolated keeper layer, such that the thickness of the keeper layer is relatively unconstrained.

It is yet another advantage of the hard disk drive of the present invention that it includes a magnetic head wherein the external magnetic fields at the free layer of the read head can be more effectively balanced.

These and other features and advantages of the present invention will no doubt become apparent to those skilled in the art upon reading the following detailed description which makes reference to the several figures of the drawings.

IN THE DRAWINGS

DETAILED DESCRIPTION OF THE PREFERRED EMBODIMENTS

Figure 1:
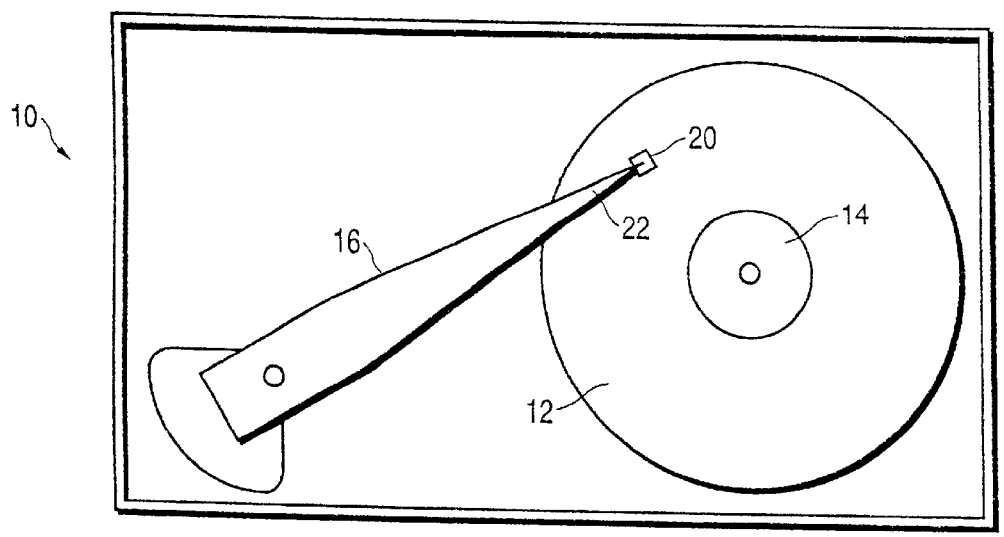
FIG. 1 is a top plan view generally depicting a hard disk drive of the present invention including a magnetic head of the present invention therein.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10, and a magnetic head 20 of the present invention is disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of each of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

The magnetic head 20 of the hard disk drive 10 is designed to both write magnetic data to the disk 12 and to read magnetic data from the disk 12, and separate thin film structures are fabricated within the magnetic head to perform the data writing functions and the data reading functions, as is well known to those skilled in the art. The present invention relates to improvements in the read head structure of the magnetic head 20, and a brief description of a prior art read head structure, as depicted in FIG. 2, is next presented to better understand the description of the present invention.

Figure 2:
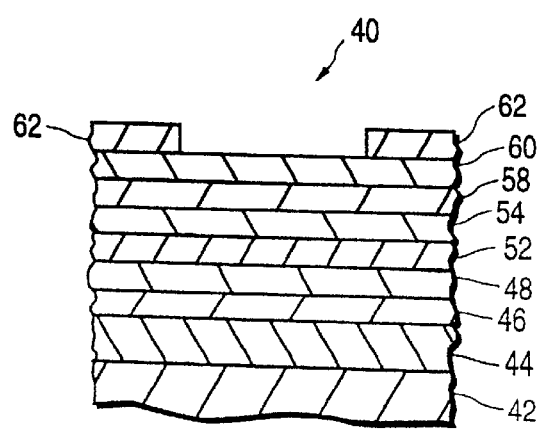
FIG. 2 is a side cross-sectional view of a read head portion of a prior art magnetic head.

FIG. 2 is a side cross-sectional view depicting a read head structure of a prior art magnetic head, as is described in U.S. Pat. No. 5,508,867, issued Apr. 16, 1996, the disclosure of which is exemplary of the pertinent read head prior art. As depicted in FIG. 2 the read head structure of the prior art magnetic head 40 includes a substrate base 42 having a magnetic keeper layer 44 formed thereon; a spacer layer 46 is formed upon the keeper layer 44, a free magnetic layer 48 is formed upon the spacer layer 46, a second spacer layer 52 is formed upon the free layer 48, a magnetically pinned layer 54 is formed upon the second spacer layer 52, an antiferromagnetic layer 58 is formed upon the pinned layer 54; a cap layer 60 is formed upon the antiferromagnetic layer 58, and electrical leads 62 are formed on the cap layer 60. In this prior art read head structure the keeper layer 40 is formed of a ferromagnetic material such as CoCr or NiFe, the first spacer layer 46 is composed of a non-magnetic material such as Ta, the free magnetic layer 48 is composed of a ferromagnetic material such as NiFe, the second spacer layer 52 is composed of a non-magnetic metallic material such as copper, the pinned magnetic layer 54 is composed of a ferromagnetic material such as NiFe, the antiferromagnetic layer 58 is composed of a material such as PtMn, and the cap layer 60 is composed of a material such as Ta. The electrical leads 62 fabricated on top of the cap layer 60 provide electrical current that passes through the various layers 44–60, and particularly the free layer 48, such that changes in the magnetic field orientation of the free layer create changes in the resistance of the read head thin film structure which create detectable fluctuations in the read head bias voltage.

It is a desired operational state of the head 40 that the free layer 48 have no effective magnetic biasing field acting upon it. Such potentially biasing magnetic fields are generated by exchange coupling between the free layer 48 and the pinned layer 54, as well as electrical current that flows through the copper spacer layer 52 and other layers of the read head structure. The keeper layer 44 of the prior art head 40 is utilized to provide a counterbalancing magnetic field at the free layer 48 that cancels the aforementioned magnetic fields, such that the free layer 48 has no effective magnetic bias field.

A problem that arises with the prior art read head structure depicted in FIG. 2 is that the keeper layer 44 acts as an electrically conductive path within the read head. That is, a significant portion of the read head electrical current passes through the keeper layer 44, rather than through the other read head layers, such as the free layer 48. The keeper layer 44 therefore acts as an unwanted electrical shunt, that decreases the sensitivity of the read head. The present invention overcomes this problem by providing an electrical insulation structure that isolates the keeper layer from the electrical current that flows through the read head, and a first preferred embodiment thereof is next presented with the aid of FIG. 3.

Figure 3:
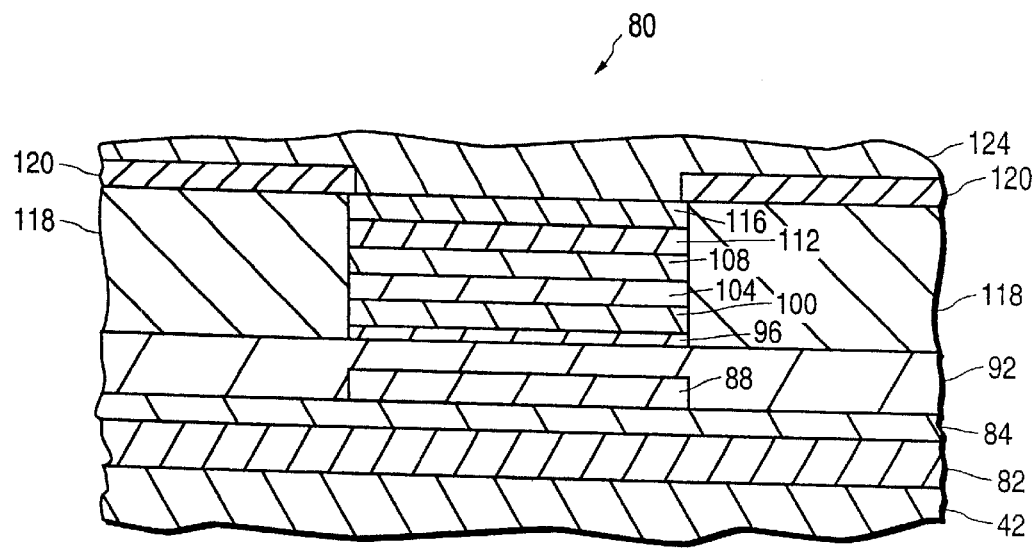
FIG. 3 is a side cross-sectional view of a first preferred embodiment of a read head portion of a magnetic head of the present invention having an insulated keeper.

FIG. 3 is a side cross-sectional view depicting a first preferred embodiment of a magnetic head 80 of the present invention having an insulated keeper. As depicted in FIG. 3, the magnetic head 80, which is suitable for use as the magnetic head 20 in FIG. 1, includes a first magnetic shield layer 82 that is formed on the substrate base 42, and a first electrical insulation layer 84 that is deposited upon the magnetic shield 82. A magnetic keeper layer 88 is next deposited upon the first insulation layer 84 and a second electrical insulation layer 92 is then deposited on top of the keeper layer 88. Further layers of the GMR read head stack are next deposited upon the second insulation layer 92. Specifically, following the deposition of a seed layer 96, a magnetic free layer 100 is deposited, followed by a spacer layer 104, followed by a magnetically pinned layer 108, followed by an antiferromagnetic layer 112, followed by a cap layer 116. Hard bias elements 118 are fabricated on each side the GMR layers 100–116, followed by the deposition of electrical lead elements 120 and another electrical insulation layer 124. Thereafter, a second magnetic shield (not shown) is deposited on the insulation layer 124, followed by further magnetic head component structures as are known to those skilled in the art.

The first electrical insulation layer 84 and second electrical insulation layer 92 serve to effectively electrically isolate the keeper 88 from the electrical current that passes through the read head layers 96–116. In the preferred embodiment, the insulation layers 84 and 92 are composed of an antiferromagnetic material, such as NiO, and the keeper layer 88 is preferably composed of a ferromagnetic material such as NiFe. Therefore, following the setting of the magnetic field within the keeper layer 88, the antiferromagnetic, electrically insulating layers 84 and 92 will become exchange coupled with the keeper layer to pin the magnetic field of the keeper layer. Additionally, because the keeper layer is electrically isolated from the other layers of the head, the magnetic field of the keeper layer can be separately reset through the passage of electrical current pulses through the keeper layer that do not pass through the other layers of the magnetic head. Therefore, the initialization of the magnetic field within the hard bias elements 118 of the magnetic head, as is well known to those skilled in the art, can be separately conducted from the setting of the magnetic field within the keeper 88. Thus, the magnetic field generated by the keeper can be effectively selected to create a minimum (near zero) bias magnetic field on the free layer, thus resulting in a magnetic head having improved read head performance characteristics.

Another advantage of the magnetic head 80 of the present invention as depicted in FIG. 3 is that the thickness of the keeper layer is not constrained as it is in the prior art device depicted in FIG. 2. Specifically, because electrical current flows through the keeper layer of the prior art head 40 depicted in FIG. 2, the thickness of the prior art keeper layer 44 should be held to a minimum to reduce the shunting effect of the electrical current that flows therethrough. In the preferred embodiment of the present invention depicted in FIG. 3, because the keeper layer 88 is electrically insulated, the thickness of the keeper layer 88 is unconstrained. Therefore, the thickness of the keeper layer may be increased, whereby the balancing magnetic field generated by the keeper layer can likewise be increased. Such an increased magnetic field from the keeper layer may be necessary in some read head layer structural configurations to effectively balance the magnetic fields at the free layer. That is, where the free layer 100 is disposed further away from the keeper layer 88, the increased magnetic field generated by a thicker keeper layer will serve to provide a magnetic balancing field at the free layer location.

Additionally, while the preferred embodiment in FIG. 3 depicts the keeper layer 88 disposed on one side of the free layer 100 with the spacer layer 104 and pinned layer 108 disposed on the other side of the free layer 100, the invention is not to be so limited. That is, the direction of the magnetic fields generated at the free layer by the pinned layer and by the current passing through the spacer layer 104 are balanced within the free layer by the direction of the magnetic fields generated within the keeper layer. Where the orientation of the free layer 100, spacer layer 104 and pinned layer 108 are other than as shown in FIG. 3, the direction and strength of the field generated by the keeper layer can be altered, as will be understood by those skilled in the art, to balance the magnetic fields within the free layer 100. Thus, a significant feature of the present invention is that the keeper layer is electrically insulated from the remaining layers of the read head, such that the thickness and magnetization direction and strength of the keeper layer can be separately set to balance the magnetic fields within the free layer. As will be understood by those skilled in the art, the magnetization of the hard bias elements 118 is set at the wafer fabrication level, while the magnetization of the keeper layer 88 can be set or reset at the wafer row level; that is, after the wafer has been initially cut into rows. A second preferred embodiment of the present invention is next presented with the aid of FIG. 4.

Figure 4:
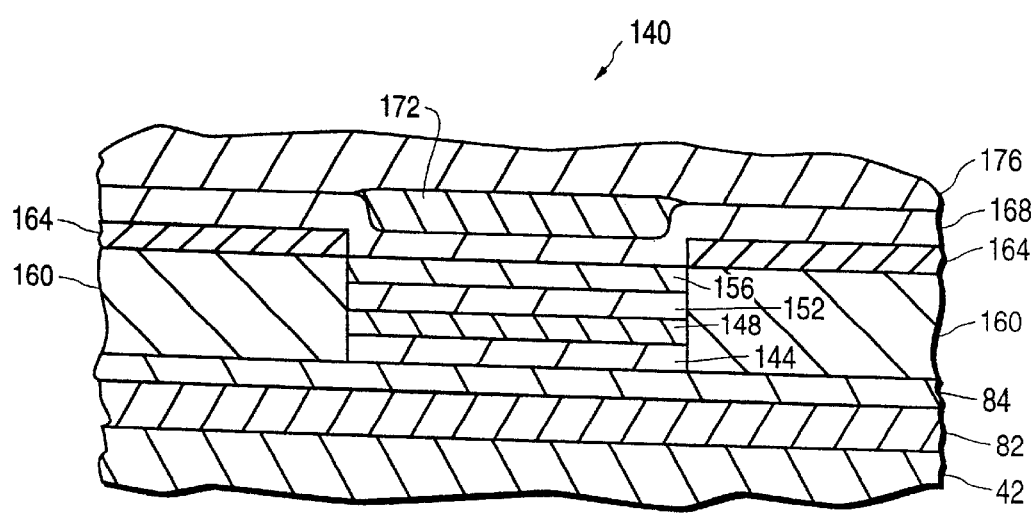
FIG. 4 is a side cross-sectional view of a second preferred embodiment of a read head portion of a magnetic head of the present invention having an insulated keeper.

FIG. 4 is a side cross-sectional view of a read head portion of a magnetic head 140 of the present invention, which can serve as the magnetic head 20 of FIG. 1, in which the keeper layer is fabricated following the fabrication of the GMR read head layers. As depicted in FIG. 4, the magnetic head 140 includes a first magnetic shield layer 82, an insulative layer which may be an antiferromagnetic layer 84, a pinned magnetic layer 144, a spacer layer 148, a free magnetic layer 152, a cap layer 156, hard bias elements 160, and electrical lead elements 164. An electrically insulative layer 168 is fabricated upon the electrical lead elements 164 and a patterned keeper layer 172 is next fabricated upon the insulation layer 168 above the read head layers 84–156. In the preferred embodiment, the electrical insulation layer 168 is composed of an antiferromagnetic material such as NiO. A further electrical insulation layer 176 is deposited on top of the keeper layer 172, and a second magnetic shield (not shown) is fabricated on the insulation layer 176 followed by further magnetic head components as are known to those skilled in the art that are fabricated on top of the second magnetic shield.

As with the magnetic head embodiment 80 depicted in FIG. 3, the keeper 172 is electrically insulated from the remaining read head layers. Thus, the thickness of the keeper layer 172 can be selected to provide appropriate magnetic balancing characteristics at the free layer 152 without regard to the electrical shunting problem that is present in the prior art head depicted in FIG. 2. Additionally, because the keeper layer 172 is electrically isolated from the read head, the strength and direction of the magnetic field within the keeper layer can be separately set as desired. The antiferromagnetic material of the insulation layer 168 serves to provide exchange coupling with the magnetic field set within the keeper layer 172, such that the keeper layer magnetic field is pinned after it is set. The objects and advantages of the magnetic head embodiment depicted in FIG. 4 are therefore similar to those obtained in the magnetic head embodiment depicted in FIG. 3.

While the present invention has been shown and described with reference to certain preferred embodiments, it will be understood by those skilled in the art that alterations and modifications in form and detail may be made therein without departing from the true spirit and scope of the invention. It is therefore intended that the following claims cover all such alterations and modifications in form and detail that nevertheless include the true spirit and scope of the invention.

I claim:

1. A magnetic head comprising:

a read head structure including a free magnetic layer;

a magnetic keeper layer being disposed proximate said free magnetic layer and being electrically insulated from said free magnetic layer by an electrical insulation layer that is composed of an antiferromagnetic material and which is disposed between said keeper layer and said free magnetic layer, whereby a magnetic field generated by said keeper layer acts to counterbalance other magnetic fields at said free magnetic layer.

2. A magnetic head as described in claim 1 wherein said electrical insulation layer is composed of NiO.

3. A magnetic head comprising:

a thin film read head structure including a free magnetic layer, a spacer layer, a pinned magnetic layer, an antiferromagnetic layer, a cap layer, hard bias elements and electrical lead elements, wherein electrical current from said electrical lead elements passes through said thin film read head structure;

a magnetic keeper layer being disposed proximate said read head structure;

an electrical insulation layer that is composed of an antiferromagnetic material being disposed between said keeper layer and said read head structure, whereby said keeper layer is electrically insulated from said read head structure.

4. A magnetic head as described in claim 3 wherein said electrical insulation layer is composed of NiO.

5. A magnetic head as described in claim 4 wherein said keeper layer is composed of a ferromagnetic material.

6. A magnetic head as described in claim 5 wherein said keeper layer is composed of NiFe.

7. A magnetic head comprising:

a substrate base, a magnetic shield being formed above said substrate space, a first insulation layer that is composed of an antiferromagnetic material being formed upon said magnetic shield, a keeper layer being formed upon said first insulation layer, a second insulation layer being formed upon said keeper layer, a free magnetic layer being formed above said second insulation layer, a spacer layer being formed above said free magnetic layer, a pinned magnetic layer being formed above said spacer layer, an antiferromagnetic layer being formed upon said pinned magnetic layer, a cap layer being formed above said antiferromagnetic layer, hard bias elements being formed proximate side portions of said free magnetic layer spacer layer and pinned magnetic layer, electrical lead elements being formed above said hard bias elements, a third insulation layer being formed above said electrical lead elements and a second magnetic shield being formed above said insulation layer.

8. A magnetic head as described in claim 7 wherein said second insulation layer is composed of an antiferromagnetic material.

9. A magnetic head comprising:

a substrate layer, a first magnetic shield layer being formed above said substrate layer, a first insulation layer being formed upon said first magnetic shield layer, an antiferromagnetic layer being formed above said first insulation layer, a pinned magnetic layer being formed upon said antiferromagnetic layer, a spacer layer being formed above said pinned magnetic layer, a free magnetic layer being formed above said spacer layer, a cap layer being formed above said free magnetic layer, hard bias elements being formed proximate side portions of said pinned magnetic layer, said spacer layer and said free magnetic layer, electrical lead elements being formed above said hard bias elements;

a second insulation layer that is composed of an antiferromagnetic material being formed above said electrical lead elements and said cap layer, a keeper layer being formed above said second insulation layer, a third insulation layer being formed above said keeper layer, and a second magnetic shield layer being formed above said third insulation layer.

10. A magnetic head as described in claim 9 wherein said third insulation layer is composed of an antiferromagnetic material.

11. A hard disk drive including a magnetic head, wherein said magnetic head comprises:

a read head structure including a free magnetic layer and a magnetic keeper layer;

said magnetic keeper layer being disposed proximate said free magnetic layer and being electrically insulated from said free magnetic layer by an electrical insulation layer that is composed of an antiferromagnetic material and which is disposed between said keeper layer and said free layer, whereby a magnetic field generated by said keeper layer acts to counterbalance other magnetic fields at said free magnetic layer.

12. A hard disk drive as described in claim 11 wherein said electrical insulation layer is composed of NiO.

13. A hard disk drive including a magnetic head, wherein said magnetic head comprises:

a thin film read head structure including a free magnetic layer, a spacer layer, a pinned magnetic layer, an antiferromagnetic layer, a cap layer, hard bias elements and electrical lead elements, wherein electrical current from said electrical lead elements passes through said thin film read head structure;

a magnetic keeper layer being disposed proximate said read head structure;

an electrical insulation layer that is composed of an antiferromagnetic material being disposed between said keeper layer and said read head structure, whereby said keeper layer is electrically insulated from said read head structure.

14. A hard disk drive as described in claim 13 herein said electrical insulation layer is composed of NiO.

15. A hard disk drive as described in claim 14 wherein said keeper layer is composed of a ferromagnetic material.

16. A hard disk drive as described in claim 15 wherein said keeper layer is composed of NiFe.

17. A hard disk drive including a magnetic bead, wherein said magnetic head comprises:

a substrate base, a magnetic shield being formed above said substrate space, a first insulation layer being composed of an antiferromagnetic material and being formed upon said magnetic shield, a keeper layer being formed upon said first insulation layer, a second insulation layer being formed upon said keeper layer, a free magnetic layer being formed above said second insulation layer, a spacer layer being formed above said free magnetic layer, a pinned magnetic layer being formed above said spacer layer, an antiferromagnetic layer being formed upon said pinned magnetic layer, a cap layer being formed above said antiferromagnetic layer, hard bias elements being formed proximate side portions of said free magnetic layer, spacer layer and pinned magnetic layer, electrical lead elements being formed above said hard bias elements, a third insulation layer being formed above said electrical lead elements and a second magnetic shield being formed above said insulation layer.

18. A hard disk drive as described in claim 17 wherein said second insulation layer is composed of an antiferromagnetic material.

19. A hard disk drive including a magnetic head, wherein said magnetic head comprises:

a substrate layer, a first magnetic shield layer being formed above said substrate layer, a first insulation layer being formed upon said first magnetic shield layer, an antiferromagnetic layer being formed above said first insulation layer, a pinned magnetic layer being formed upon said antiferromagnetic layer, a spacer layer being formed above said pinned magnetic layer, a free magnetic layer being formed above said spacer layer, a cap layer being formed above said free magnetic layer, hard bias elements being formed proximate side portions of said pinned magnetic layer, said spacer layer and said free magnetic layer, electrical lead elements being formed above said hard bias elements;

a second insulation layer that is composed of an antiferromagnetic material being formed above said electrical lead elements and said cap layer, a keeper layer being formed above said second insulation layer, a third insulation layer being formed above said keeper layer, and a second magnetic shield layer being formed above said third insulation layer.

20. A hard disk drive as described in claim 19 wherein said third insulation layer is composed of an antiferromagnetic material.

* * * * *